Oct. 3, 1933.  G. M. BELLANCA  1,929,135

CONTROL SURFACE FOR AIRPLANES

Filed Aug. 10, 1931

Inventor
GIUSEPPE M. BELLANCA
By Semmes & Semmes
Attorneys

Patented Oct. 3, 1933

1,929,135

UNITED STATES PATENT OFFICE 1,929,135

CONTROL SURFACE FOR AIRPLANES

Giuseppe M. Bellanca, New Castle, Del.

Application August 10, 1931. Serial No. 556,256

1 Claim. (Cl. 244—29)

This invention relates to airplanes and more particularly to improved control surfaces for airplanes.

A major object of the present invention is to provide an airplane which is inherently stable and which is of high maneuverability.

Yet another object is to provide an airplane with a relatively large control area.

Yet a further object is to provide an airplane construction in which optimum aileron area is secured without resort to the short thick aileron type.

With these and other equally important objects in view the invention resides in the concept of constructing an airplane in such a manner that there is provided an airfoil which subserves the function of a strut. With this airfoil strut is associated an aileron of the long narrow type. This aileron in conjunction with the aileron of the main wing and in conjunction with the lift strut at once imparts great stability and easy maneuverability to the plane without any appreciable increase in resistance.

In order to enable a more ready understanding of the invention a typical physical embodiment is shown in the accompanying drawing, in which.

Figure 1:
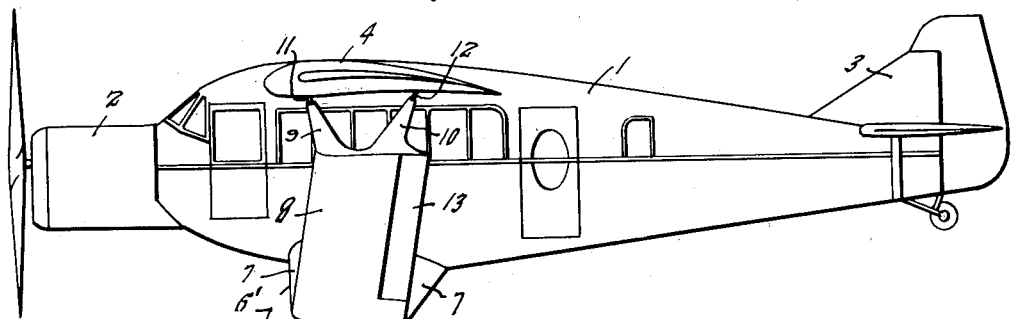
Fig. 1 is a side elevation of an airplane embodying the improvement.
Figure 2:
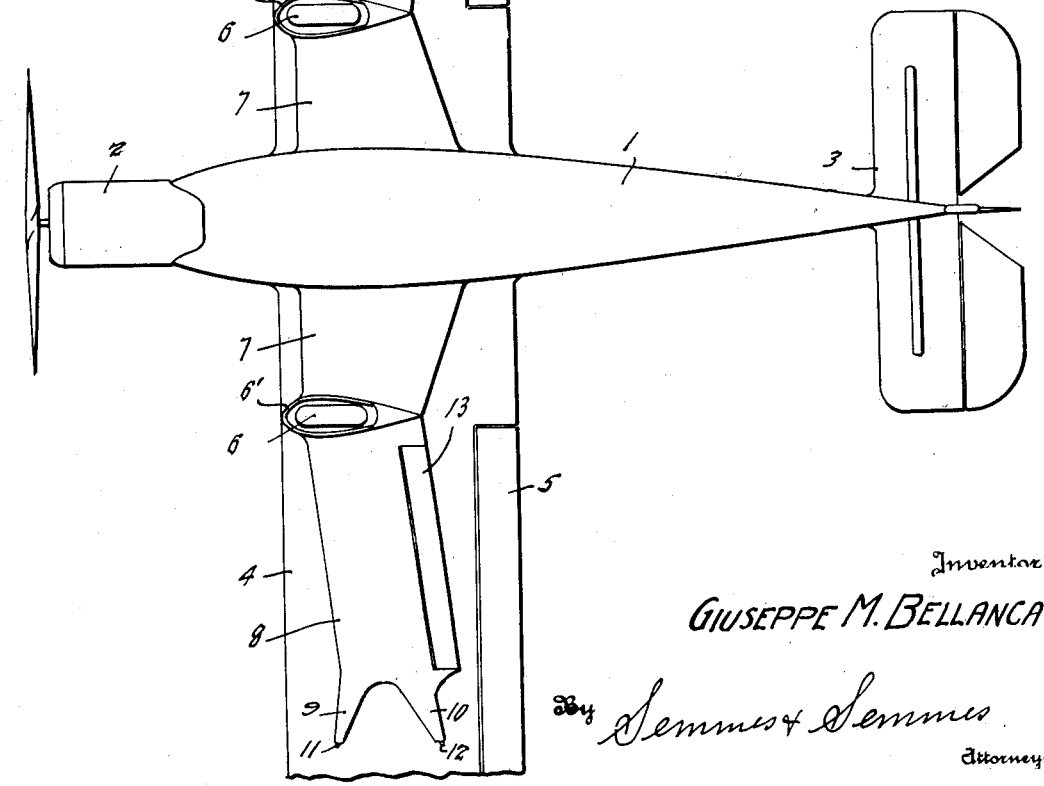
Fig. 2 is a bottom plan view thereof.

As shown in the drawing, the invention may be embodied in an airplane of the Bellanca type which comprises a fuselage 1, either of the cabin or open cock-pit type, a power plant 2 and the empennage 3. The plane is driven by a tractor propellor. Suitably mounted upon the fuselage are the main wings 4. Preferably these are attached to the fuselage at the upper portion thereof. These main wings are provided with ailerons 5 of the usual or conventional type. These ailerons are preferably of the long narrow type and, if desired, may be balanced.

The airplane is provided with landing wheels 6 which are suitably mounted upon resilient landing supports at the junction of a stub wing or airfoil 7 and a lift strut 8 of airfoil section. Fairing members 6 are provided which substantially completely enclose the landing wheels. The lift strut 8 is provided with two extensions 9 and 10 which are secured respectively at 11 and 12 to the under side of the leading and trailing spar of the main wing. This type of wing construction, as will be appreciated, insures maximum stability.

The lift strut 8 is mounted with any desired positive or negative angle of incidence and upon any desired dihedral angle. Suitably mounted upon a rigid portion thereof, such for example as the trailing spar, is the aileron 13, preferably of the long narrow type. The aileron angles of the ailerons 5 and 13 respectively may be of any desired value to impart the desired characteristics to a given machine. This type of structure is particularly useful in transport planes or other slow flying machines where the need for increased control area arises. Similarly this type of structure is especially useful in short planes. The design of the ailerons 5 and 13 may be so controlled as to give the desired total aileron surface to the plane, which in the preferred embodiment is approximately 12% of the wing surface area.

This type of structure presents other advantages. As a general proposition the short aileron is more effective in producing rolling, for the same angle of throw, than is the long narrow aileron, but such ailerons are disadvantageous because of the relatively great moments around the hinge pin. For this reason the long narrow ailerons are generally preferred and for the same percentage of wing area the long narrow aileron is generally considered to be the most efficient. In the preferred embodiment, by mounting an aileron on the lift wing 8 at an angle to the lateral horizontal axis of the airplane, in conjunction with the usual aileron on the horizontal or substantially horizontal axis, an improved rolling effect is secured. This aileron in conjunction with the lift wing 8 which, as will be appreciated, serves very effectively to impart the lateral stability of the plane, provides for optimum lateral maneuverability.

It will be appreciated that the ailerons 13 and 5 may be interconnected for simultaneous operation or may be separately operated. It will also be appreciated that if desired the ailerons 5 and 13 may be simultaneously operated, but through a different degree of throw, by properly proportioning the length of the lever operating arms. A special benefit resulting from this type of structure is the effectiveness of the plane in coming out of a bank. In such circumstances when the main wings are at some position displaced from the horizontal, the lift strut wings and hence the aileron 13 more nearly approach horizontal and hence more nearly approach their maximum control characteristics.

In the construction of a very large plane in which appreciable control surfaces are placed in the empennage, the lift strut 8 including the aileron 13, may be included in the empennage, as for example by extending it from the fuselage to the underside of the stabilizer.

Hence while a preferred embodiment of the invention has been disclosed, it is to be understood that this is given merely as a typical example of the embodiment of the principles of the invention in an airplane. Obviously the lift strut 8 and its associated aileron 13 might be mounted in positions other than that shown and might be utilized, in large planes, in tandem and/or tandem and parallel relations. Similarly also, if desired, an aileron of the type of aileron 13 might be incorporated in the stub lift wing 7. Therefore, while a preferred embodiment has been shown, it is not intended to limit the invention to this except as such limitations are clearly imposed by the appended claim.

I claim:

An airplane comprising a fuselage, a main wing extending substantially horizontally from the fuselage and provided with the aileron, a short stub wing section extending downwardly from a lower section of the fuselage, a strut wing connected respectively to the underside of the spars of the main wing and the tip of the strut wing, the strut wing being provided with an aileron pivotally connected to its trailing edge, said strut ailerons being spaced from both the fuselage and the main wing and constituting a minor portion of the total area of the lift strut surface so that the lift strut develops an appreciable aerodynamic lift for any given position of its associated aileron.

GIUSEPPE M. BELLANCA.